July 13, 1926.  A. L. SMITH  1,592,162

BACKGROUND FOR PHOTOGRAPHIC NEGATIVES

Filed Oct. 15, 1925  2 Sheets-Sheet 1

INVENTOR,
Albert Louis Smith,
By Minturn & Minturn,
Attorneys.

July 13, 1926.

A. L. SMITH 1,592,162

BACKGROUND FOR PHOTOGRAPHIC NEGATIVES

Filed Oct. 15, 1925   2 Sheets-Sheet 2

INVENTOR,
Albert Louis Smith,
By Minturn & Minturn,
Attorneys.

Patented July 13, 1926.

1,592,162

UNITED STATES PATENT OFFICE.

ALBERT LOUIS SMITH, OF INDIANAPOLIS, INDIANA.

BACKGROUND FOR PHOTOGRAPHIC NEGATIVES.

Application filed October 15, 1925. Serial No. 62,517.

My invention relates to a photographic process of printing from negatives, and deals in particular with means for incorporating a selected background on a photographic print to suit the object reproduced without the necessity of having to photograph the actual background, or to make up or touch up a background by handwork.

It is apparent that different objects require different backgrounds for their most effective display, and it is the same in the art of photography. The reproduction of an individual is most effectively had when the background selected relieves the harshness of a flat background and provides the setting for a harmonious balancing of lights and shadows.

To secure a suitable background in the photographic studio heretofore has either required the employment of a screen displaying the particular background back of the object being photographed, such that to meet the wide range of subjects photographed, a considerable number of screens each of a different configuration, had to be carried in stock, or required a considerable amount of handwork necessarily slow and tedious to make up an individual background. I avoid the necessity for having such varied background screens, or the employment of hand work and employ but only a simple, plain screen, and effect the desired background on the finished print by the means as illustrated in the accompanying drawing, in which—

Figure 1:
Figure 2:
Figure 4:
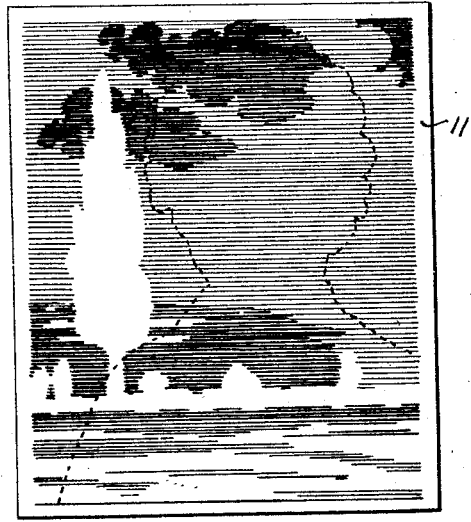
Figure 3:
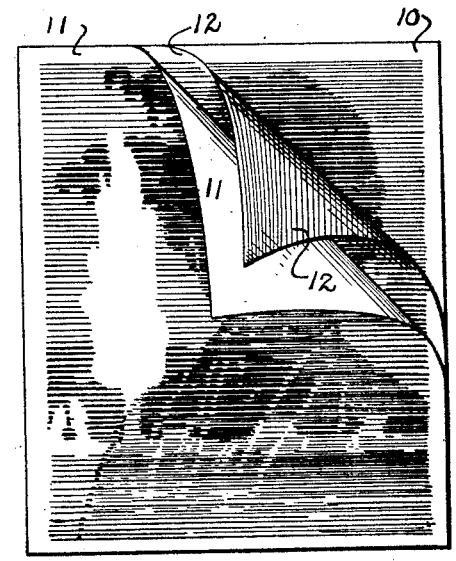
Figure 5:
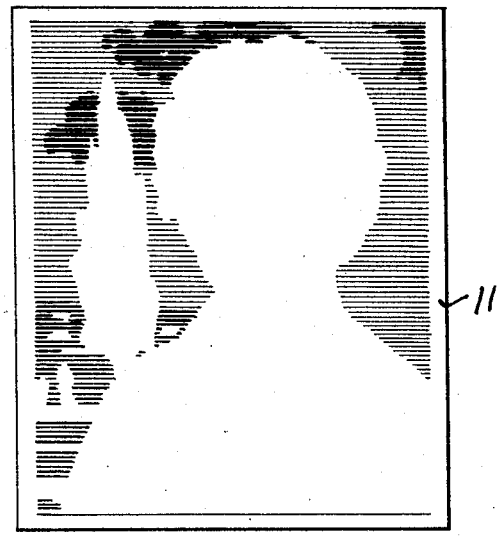

Fig. 1 indicates a photographic print where a plain background has been used; Fig. 2, a print from the same negative as used to produce Fig. 1, but with a figured background; Fig. 3, a photographic negative placed back of the sheets of my background negative; Fig. 4, my background negative with the outline of the figure on the fly-sheet showing through; Fig. 5, the same view of the background negative as shown in Fig. 4, but with that portion of the background removed within the outline of the figure; and Fig. 6, the relative positions of the negatives and paper when ready for printing.

Like characters of reference indicate like parts throughout the several views in the drawing.

I photograph the object or person in the usual manner with the exception that I use a dark, or even black background so as to produce an almost clear or light negative in all parts showing the background. Such a negative, when printed from, will permit the easy passage of the light through the background portion.

The photographic negative 10 being so produced as above indicated, I then select a suitable background negative 11. I form this background negative 11 by previously printing the background design in ordinary printers' ink on a sheet of translucent tissue-paper, the printed portion being of the same or approximate size as the photographic negative. The sheet used for the background negative has a clear or unprinted fly-sheet 12 folded from the lower edge and around against the back side of the printed portion. A quantity of such printed background negatives may be kept in supply.

The photographic negative 10 is placed on the back side of the fly-sheet 12, with the background negative 11 in front, as in Fig. 3, the two negatives being properly faced with relation to each other to insure the printing of a positive combination—it being remembered that my background design is printed as a negative on the tissue-paper. By placing the negatives 10 and 11, as above arranged on a glass toward a light, the outline of the object on the photographic negative 10, here shown as the bust of woman, is readily observed, and after the photographic negative 10 is properly registered with the background negative 11, the background negative 11 is turned back away to leave the fly-sheet only over the photographic negative 10, and the outline of the bust is then traced on the fly-sheet 12.

The photographic negative 10 is then removed from behind the fly-sheet 12, and the background negative is turned back over to bring the fly-sheet 12 behind, such that the outline of the bust will be observable through the background negative 11, as in Fig. 4.

That portion of the printed background lying within the outline so showing is removed by softening and rubbing with wood alcohol, as indicated in Fig. 5. It will be noted that no outline or marking has been made on the background negative 11 at any place, such marking being confined entirely to the fly-sheet 12, with the result that there is no sharp mark or line around the portion of the figure removed.

The fly-sheet 12 has now accomplished its purpose as carrying the outline to guide in the removal of the ink within the boundary of the bust and is removed from the background negative 11 by tearing or cutting off at the fold along the bottom edge.

Figure 6:
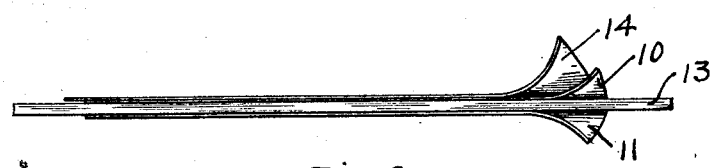

The background negative 11 now so treated is placed upon one side of a glass 13, Fig. 6, and the photographic negative 10 on the opposite side of the glass so as to register the outlines of the bust on the two negatives. The print paper 14 is then placed back of the photographic negative 10, and the printing exposure made in the usual and well known manner, to give a print as indicated in Fig. 2, as opposed to the print from the same photographic negative indicated in Fig. 1, where no background negative was used.

By placing the glass 13 between the photographic negative 10 and the background negative 11, the light rays are so diffused that the background design does not stand out sharply outlined on the print but has a softened effect. A sharper outlined background, of course, may be secured by omitting the glass 13 from between the negatives.

While I have described my invention in the form now best known to me, it is obvious that variations may be had without departing from the spirit of the invention, and I, therefore, do not desire to be limited to the precise form and steps as shown, nor any more than may be necessitated by the following claims.

I claim:

1. A background negative comprised of translucent tissue having a background design thereon in negative form, said design being capable of being readily removed from the tissue, and a translucent fly-sheet fixed to and adapted to be folded behind the negative.

2. The combination, with a photographic negative having an object, of a background negative comprised of translucent paper having a background design thereon in negative form covering its entire surface, said design being capable of ready and entire removal from the paper opposite the object on the photographic negative, when the latter is in close printing relation.

In testimony whereof I affix my signature.

ALBERT LOUIS SMITH.